United States Patent Office 2,768,999
Patented Oct. 30, 1956

2,768,999

PHOSPHOSULFURIZED HYDROCARBONS AND PRODUCTION THEREOF

Max W. Hill, Somerville, N. J., assignor to Esso Research and Engineering Company, a corporation of Delaware No Drawing. Application August 27, 1952,
Serial No. 306,711

7 Claims. (Cl. 260—139)

This invention relates to an improved process for making phosphosulfurized hydrocarbons and their derivatives and to the improved compounds resulting from this process.

This application is a continuation-in-part of Serial No. 129,196 filed on November 23, 1949, in the names of Max W. Hill and Robert H. Jones, now Patent No. 2,640,053.

Phosphosulfurized hydrocarbons and various derivatives thereof are well known to the art as additives having detergency, anti-corrosive, extreme pressure and other properties when used in lubricants and the like. A serious difficulty, however, has been encountered with respect to the instability of the products, particularly as regards hydrogen sulfide ($H_2S$) evolution. The products frequently have poor color and odor characteristics, are corrosive to some metals such as copper, and are generally unsuitable for marketing as such. Furthermore, relatively severe reaction conditions are needed to form materials containing desired sulfur and phosphorus concentrations.

Various schemes have been devised for improving phosphosulfurized hydrocarbons. For example, the titratable acidity of the product has been neutralized with bases or basic-reacting reagents, or with esterifying agents. Advantages have been realized by the use of these schemes, but as yet none of them has provided a complete answer to the aforementioned problems. In accordance with the present invention, significant improvements are obtained in the hydrocarbon-phosphosulfurization step and also in the quality of resulting product.

Briefly, the present invention is based upon the discovery of a catalytic phosphosulfurization process in which the reaction is carried out in the presence of small amounts of a peroxide-type catalyst. In producing products having a given phosphorus and sulfur content, the use of a catalyst permits the phosphosulfurization step to be carried out at significantly lower temperatures and contact times than is possible in the uncatalyzed process. Furthermore, economical utilization of the phosphosulfurization agent is realized at relatively mild reaction conditions. The resulting products have markedly superior stability to the uncatalyzed products made under similar conditions. This improvement is reflected in reduced $H_2S$ evolution tendencies and improved color, both in the product and in various derivatives thereof. The present process is also advantageous in that no catalyst separation step is required after completion of the reaction, any catalyst remaining apparently having a beneficial effect on the product.

It is not desired to restrict the invention as to theory or mode of operation, but it appears that the peroxide acts by forming free radicals which initiate a chain reaction and lowers energy requirements for the phosphosulfurization reaction. It also appears that the peroxide causes the chemically combined sulfur to be more firmly bound to the hydrocarbon. This results in a product of greater stability to that produced in non-catalytic operations under substantially the same reaction conditions.

The reaction is carried out by contacting the hydrocarbon to be treated with a phosphosulfurizing agent in the presence of catalyzing amounts of a peroxide at an elevated temperature whereby a sulfur and phosphorus-containing reaction product is formed. Reaction times in the range of about 30 minutes to 10 hours or higher and temperatures in the range of about 150° to 600° F., preferably in the range of about 250° to 400° F. may be used. Reaction conditions will depend on such factors as the amount of phosphosulfurizing agent and catalyst used, the hydrocarbon employed, and the amount of sulfur and phosphorus to be incorporated in the product.

The reaction is preferably carried out in a non-oxidizing atmosphere, such as an atmosphere of nitrogen. The product may then be filtered through a suitable filtering means to remove unreacted phosphosulfurizing agent, sludge, etc.

The phosphosulfurization agent may be $P_2S_3$, $P_2S_5$, $P_4S_3$, $P_4S_7$ or their mixtures, or mixtures of elemental phosphorus and sulfur or other materials. A sulfide of phosphorus, especially phosphorus pentasulfide ($P_2S_5$) is preferred. Generally, in the range of about 1.0 to 50.0% by weight, based on the hydrocarbon, of phosphosulfurizing agent is used. A preferred range is about 5 to 25 weight %. Products containing above about 0.5% by weight of sulfur and phosphorus are readily formed under these treating conditions.

The peroxide catalysts may be either inorganic or organic, although the latter type is generally more effective. Organic peroxides include aliphatic and aromatic peroxides such as dialkylperoxides, alkylperoxy hydrocarbon derivatives, phenyl peroxides, phenyl hydroperoxides, and the like. Specific compounds include benzoyl peroxide, di-tert.-butyl peroxide, cumene hydroperoxide, acetyl peroxide, lauroyl peroxide, and tert.-butyl perbenzoate. The aromatic peroxides are generally preferred. Typical inorganic peroxides include hydrogen peroxide, sodium peroxide, barium peroxide, potassium persulfate, ammonium persulfate and the like. The readily available benzoyl peroxide and cumene hydroperoxide are preferred from the standpoint of both cost and effectiveness.

The amount of peroxide-type catalyst used may be varied considerably, but catalytic amounts are generally in the range of about 0.05 to 5.0, preferably 0.1 to 2.0% by weight based on the hydrocarbon being treated. Such amounts will, as a rule, permit the reaction to be conducted at temperatures as much as 100° F. lower than are used in uncatalyzed operations to obtain products of comparable phosphorus and sulfur contents.

Hydrocarbons to be treated should, of course, be reactive with the phosphosulfurizing agent. They include paraffins, olefins, diolefins, acetylenes, aromatics, cyclic aliphatics, and various mixtures of these such as are found in petroleum fractions, condensation products of petroleum fractions, hydrogenated coals, synthetically produced hydrocarbons and the like. Hydrocarbons having molecular weights above about 100 to 150 are usually preferred. Particularly preferred are lubricating oil distillates and base stocks such as bright stock residuums and the like.

Specific hydrocarbons include petrolatums and waxes, isobutylene, decene, dodecene, olefinic extracts of gasolines or gasoline itself, cracked cycle stocks, olefinic polymers such as those having molecular weights up to as high as 10,000, butadiene, cyclopentadiene, terpene and terpene derivatives, acetylene and substituted acetylenes. Aromatic hydrocarbons such as benzene, xylenes, napthalene, anthracene, and other alkylated and/or condensed ring aromatics may be used. Various resin oils derived from petroleum residua are useful. It will be obvious to the skilled workman that other types of hydrocarbons not specifically mentioned may be employed effectively in accordance with the present invention.

After the phosphosulfurization step has been completed, it is generally desirable to form an inorganic or organic derivative thereof whereby the product is further stabilized and improved. This may be done by reacting the acidic product with a neutralizing agent such that its titratable acidity is at least partially reduced. Neutralizing agents include bases or basic reacting materials, esterifying reagents, reactive olefinic hydrocarbons, ethers, unsaturated esters, etc. For example, the phosphosulfurized hydrocarbon may have a portion or all of its titratable acidity neutralized by treatment with a hydroxide, carbonate, or oxide of alkali and alkaline earth metals, such compounds including potassium or sodium hydroxide, barium hydroxide, lime, etc. Such products are quite useful where it is desired to incorporate a metal constituent in the finished material for detergency purposes. Other basic reagents such as ammonia, alkyl or aryl substituted ammonia and amines and the like may be used.

A preferred class of basic reagents comprise guanidine cation-containing compounds such as guanidine and its derivatives. These include guanidine carbonate, methyl guanidine, decylguanidine, tribenzylguanidine, and the like. The guanidine derivatives of phosphosulfurized hydrocarbons are desirable ashless detergents for aviation lubricants and the like since they contain no metal constituent.

Esterifying reagents include aliphatic alcohols, phenols, and mercaptans such as the ethyl, butyl, and pentyl alcohols and mercaptans. Treatment of the acidic product with these materials improves the odor thereof. The product may also be treated with a reactive olefinic material, such as isobutylene, diisobutylene, cyclopentene, terpenes including dipentene, alpha pinene, terpenolene and other hydrocarbons containing at least one olefinic double bond. The use of reactive olefins for this purpose is disclosed and claimed in said patent application, Serial No. 129,196.

The above mentioned neutralizing reactions may be carried out at temperatures in the range of from about 60° up to about 400° F. for times such as about 0.5 to 10 hours, the amounts of materials being used depending on factors such as the extent to which the titratable is to be reduced or to which the stability of the product is to be improved. Amounts of neutralizing reagents may, for example, vary in the range of about 0.5 to 50% by weight, preferably 1 to 30% by weight, based on the phosphosulfurized hydrocarbon.

The phosphosulfurized hydrocarbon or the derivatives thereof may be stored and shipped as produced but are generally handled in the form of concentrates in an oil base stock containing as much as 20 to 50 or more weight percent of the active ingredient. The concentrate may then be used for addition in small quantities to fuels, lubricants, greases, etc. The additive may be added to lubricants and greases in minor amounts in the range of about 0.1 to 20 weight percent, the specific amount depending on the ultimate use of the lubricant. For example, amounts below about 5 to 10% will generally suffice for detergency purposes whereas amounts in the range of 5 or 10% up to about 20% may be used in gear lubricants and the like for extreme pressure service.

The invention will be further illustrated by reference to the following examples:

EXAMPLE 1.—PREPARATION OF PRODUCTS

Two reactions were carried out under identical conditions in the following manner. To each of two one-liter, three-necked, round bottom flasks, equipped with stirrers, nitrogen inlet tubes and exhaust tubes, were added 400 grams of a bright stock lubricating oil of 150 S. U. S. viscosity at 210° F. and 40 grams of phosphorus pentasulfide. To container A no further additions were made, but to container B, 4 grams of benzoyl peroxide were added. Both flasks were heated rapidly to about 300° F. and then maintained at about 300° to 320° F. for four hours with vigorous stirring, and a continuous stream of nitrogen was passed through the reaction mixture. At the end of four hours, the two reaction mixtures were filtered separately through diatomaceous earth. All the equipment was thoroughly washed with benzene, the benzene solution filtered and added to the main products. The benzene was then distilled from the two products. The effect of the benzoyl peroxide is clearly demonstrated by the following analysis of the two products:

| Analyses | Product A, Uncatalyzed Product | Product B, Peroxide Catalyzed Product |
| --- | --- | --- |
| Phosphorus, wt. percent | 1.37 | 2.10 |
| Sulfur, wt. percent | 3.20 | 4.66 |
| Saponification Number, Mg. KOH/gm | 46.80 | 72.70 |
| Neutralization Number, Mg. KOH/gm | 20.34 | 30.65 |

It will be noted that over 50% more phosphorus and sulfur is introduced in the catalyzed reaction product than in the uncatalyzed reaction product. Thus, the utilization of $P_2S_5$ was considerably better in the catalyzed reaction than in the uncatalyzed reaction. When no catalyst is used, considerably higher reaction temperatures must be employed to obtain sulfur and phosphorus contents comparable to those obtained with the peroxide under reaction conditions that are otherwise comparable.

EXAMPLE 2.—PREPARATION OF DERIVATIVES

The catalyzed and uncatalyzed products of Example 1 were treated with aqueous guanidine carbonate in the following manner: Each sample was neutralized with 10 wt. percent of guanidine carbonate (as a 30% aqueous solution) and heated while stirring vigorously until all the water had been removed. The material was then filtered through diatomaceous earth. A hydrogen sulfide evolution test was carried out on the guanidine derivatives as follows. The two samples were placed in capped 4-ounce bottles which were stored at 140° F. for 24 hours. At the end of this period, the bottle caps were replaced with a paper saturated with lead acetate solution. The darkening of the paper, due to the lead sulfide formed, was rated on a scale from 0 to 7, with 0 denoting no darkening and 7 denoting a completely darkened paper. The results are shown below:

| Guanidine Derivative | Lead Acetate Paper Darkening Rating |
| --- | --- |
| Uncatalyzed (Product A) | 7 |
| Peroxide Catalyzed (Product B) | 2 |

The stability of the derivative of the phosphorus- and sulfur-containing product made with the catalyst was markedly superior to that of the product made with no catalyst.

EXAMPLE 3.—LAUSON ENGINE EVALUATIONS

Each of the two guanidine derivatives of Example 2 was blended in a 4% concentration in a solvent extracted naphthenic oil of 60 S. U. S. at 210° F. The two blends were submitted, along with a portion of the oil base stock, to standard 25 hour Lauson engine tests (1800 R. P. M., 300° F. oil temperature). The oils were rated on a demerit system, a zero rating being given an oil producing a clean piston surface and a 10 rating being given an oil which produces the worst condition that could be expected. The loss in weight of the copper-lead (Cu-Pb) bearings was also obtained for each run. The following results were obtained.

*25 hour Lauson engine test*

| Wt. Percent Guanidine Derivative in Oil | Piston Skirt Varnish Demerit | Cu-Pb Bearing Weight Loss, Grams/ Bearing |
|---|---|---|
| None | 4.50 | 0.10 |
| 4% Product A (Uncatalyzed) | 1.50 | 0.15 |
| 4% Product B (Catalyzed) | 0.25 | 0.03 |

The guanidine derivative of the uncatalyzed product is a good ashless detergent, but the product of the present invention gave only one-sixth the varnish demerit given by the former material.

The products of the present invention may be employed as additives in motor fuels, hydraulic fluids, cutting oils, turbine oils, fuel oils, transformer oils, and the like, as well as in lubricants and greases, as anti-oxidants, sludge dispersers, etc. They may be used in conventional mineral oil lubricants and synthetic lubricants of the poly-ester or poly-ether types or in other synthetics such as carbonates, acetols, formols, etc. as well as admixtures of these. Other agents such as pour depressors, viscosity index improvers, solubilizers, and the like may, of course, be used in the compositions.

What is claimed is:

1. In a process for forming a sulfur and phosphorus-containing organic reaction product wherein a hydrocarbon is reacted with a phosphosulfurizing agent at an elevated temperature, the improvement which comprises carrying out the reaction in the presence of a catalyzing amount of a peroxide selected from the group consisting of benzoyl peroxide, t-butyl peroxide and potassium persulfate.

2. In a process for forming a sulfur and phosphorus-containing organic reaction product wherein a hydrocarbon is reacted with a sulfide of phosphorus at a temperature above about 150° F., the improvement which comprises carrying out the reaction in the presence of about 0.05 to 5.0% by weight, based on the hydrocarbon, of a peroxide selected from the group consisting of benzoyl peroxide, t-butyl peroxide and potassium persulfate.

3. A process as in claim 2 wherein said hydrocarbon is selected from the group consisting of mineral lubricating oil and polybutene.

4. A process as in claim 2 wherein said reaction product is further reacted with a neutralizing agent in an amount sufficient to reduce at least partially the titratable acidity thereof.

5. In a process for forming a sulfur and phosphorus-containing organic reaction product wherein a mineral lubricating oil is reacted with about 1 to 50% by weight, based on said mineral lubricating oil, of a sulfide of phosphorus at a temperature in the range of about 250 to 400° F., the improvement which comprises carrying out the reaction in the presence of about 0.1 to 2.0% by weight, based on said mineral lubricating oil, of benzoyl peroxide.

6. A process as in claim 5 wherein said reaction product is further reacted with guanidine carbonate in an amount in the range of about 1 to 30% by weight, based on said reaction product.

7. In a process for forming a sulfur and phosphorus-containing organic reaction product wherein polybutene is reacted with about 1 to 50% by weight, based on said polybutene, of a sulfide of phosphorus at a temperature in the range of about 250° to 400° F., the improvement which comprises carrying out the reaction in the presence of about 0.1 to 2.0% by weight, based on said polybutene, of a peroxide selected from the group consisting of benzoyl peroxide, t-butyl peroxide and potassium persulfate.

References Cited in the file of this patent

UNITED STATES PATENTS

| 2,316,080 | Loane | Apr. 6, 1943 |
| 2,388,199 | Williams | Oct. 30, 1945 |
| 2,476,812 | Buckmann | July 19, 1949 |
| 2,640,053 | Hill et al. | May 26, 1953 |
| 2,644,792 | Hill | July 7, 1953 |